US00RE37633E

(19) United States
(12) Reissued Patent
Fuseya

(10) Patent Number: US RE37,633 E
(45) Date of Reissued Patent: Apr. 9, 2002

(54) ACCUMULATING FUEL INJECTION APPARATUS

(75) Inventor: Tsutomu Fuseya, Yokohama (JP)

(73) Assignees: Isuzu Motors Limited; Hirohisa Tanaka, both of Tokyo (JP)

(21) Appl. No.: 09/490,874

(22) PCT Filed: Aug. 6, 1996

(86) PCT No.: PCT/JP96/02218

§ 371 Date: Feb. 6, 1997

§ 102(e) Date: Feb. 6, 1997

(87) PCT Pub. No.: WO97/08452

PCT Pub. Date: Mar. 6, 1997

Related U.S. Patent Documents

Reissue of:
(64) Patent No.: 5,711,277
Issued: Jan. 27, 1998
Appl. No.: 08/776,698
Filed: Feb. 6, 1997

(30) Foreign Application Priority Data

Aug. 29, 1995 (JP) ..... 7-242387

(51) Int. Cl.[7] ..... F02M 37/04
(52) U.S. Cl. ..... 123/496; 123/467; 123/179.17
(58) Field of Search ..... 123/500, 501, 123/467, 496, 299, 300, 179.17; 239/533.01–533.12

(56) References Cited

U.S. PATENT DOCUMENTS

| | | | | |
|---|---|---|---|---|
| 4,640,252 | A | 2/1987 | Nakamura | 123/496 |
| 4,669,429 | A | 6/1987 | Nishida | 123/179.17 |
| 5,004,154 | A | 4/1991 | Yoshida | 123/496 |
| 5,150,684 | A | 9/1992 | Jun | 123/496 |
| 5,156,132 | A | 10/1992 | Iwanaga | 123/496 |
| 5,477,834 | A | 12/1995 | Yoshizu | 123/496 |
| 5,484,104 | A | 1/1996 | Kukler | 123/496 |
| 5,526,792 | A | 6/1996 | Goth | 123/496 |
| 5,588,412 | A | 12/1996 | Nozaki | 123/496 |

FOREIGN PATENT DOCUMENTS

| | | |
|---|---|---|
| EP | 0 426 205 A2 | 5/1991 |
| JP | 57-142170 | 9/1982 |
| JP | 59-165858 | 9/1984 |
| JP | 62-282164 | 12/1987 |
| JP | 2-56854 | 4/1990 |
| JP | 2-161165 | 7/1990 |
| JP | 3-964 | 1/1991 |
| JP | 3-965 | 1/1991 |
| JP | 4-36064 | 2/1992 |
| JP | 6-159184 | 6/1994 |
| JP | 7-11996 | 1/1995 |

OTHER PUBLICATIONS

Patent Abstracts of Japan; Publication No. 02161165, Jun. 21, 1990, "Fuel Injection Device". No. 4752, p. 10.

*Primary Examiner*—Carl S. Miller
(74) *Attorney, Agent, or Firm*—Browdy and Neimark

(57) ABSTRACT

This accumulating fuel injection apparatus is provided with a needle valve 6 adapted to open and close an injection nozzle 11 having injection ports 14 in a lower end portion thereof, a balancing chamber 5 formed in a casing 2 so as to apply a fuel pressure to a head portion of the needle valve 6, a supply passage including a slit 10 and used for supplying a fuel from a fuel supply port 19 to the balancing chamber 5, a discharge passage 20 comprising an orifice for discharging the fuel from the balancing chamber 5, and a solenoid valve 22 adapted to open and close the discharge passage 20, the lift of a valve disc 26 of the solenoid valve 22 is controlled by a lift control means comprising a stopper 28 the position of which is controlled by a lift control mechanism 23. The opening area of the discharge passage 20 comprising an orifice increases and decreases in accordance with the lift of the valve disc 26, and the lift of the needle valve 6 is determined so that the opening area of the slit 10 facing the interior of the balancing chamber 5 increases and decreases correspondingly to the flow rate of the fuel passing through the discharge passage 20, the degree of opening of the injection nozzle 11 increasing and decreasing accordingly.

16 Claims, 11 Drawing Sheets

ACCUMULATING FUEL INJECTION APPARATUS

Matter enclosed in heavy brackets [ ] appears in the original patent but forms no part of this reissue specification; matter printed in italics indicates the additions made by reissue.

TECHNICAL FIELD

This invention relates to an accumulator fuel injection apparatus applied to internal combustion engines, such as a diesel engine.

BACKGROUND ART

The conventional fuel injection apparatuses for multi-cylinder engines include an apparatus of a fuel injection system (electronically controlled fuel injection system) in which the controlling of an injection rate and injection time is done by an electronic circuit, an apparatus of a common injection system (common-rail injection system) in which a fuel is distributed from an injection pump to combustion chambers through a common passage, and an apparatus of a pressure storage type injection system (accumulator injection system) in which a fuel is distributed from an injection pump to combustion chambers through a common passage and an accumulator. Since the fuel injection apparatuses themselves of these systems are not provided with an accumulator in which the fuel from an injection pump is temporarily stored, the supplying of the fuel to these apparatuses is done through a common rail, a common passage, i.e. an accumulator.

FIG. 8 shows an injector (which will hereinafter be referred to as a first conventional example) for a conventional accumulating fuel injection apparatus. Such a conventional injector is a pressure balancing type injector disclosed in, for example. Japanese Patent Laid-Open Nos. 165858/1994 and 282164/1987, which is formed so that a fuel is supplied to or discharged from a balancing chamber by turning on or off a solenoid valve, whereby a needle valve is seated on or lifted from a seat of the nozzle, and which is adapted to lift the needle valve from the seat by removing a needle valve closing fuel pressure applied to the interior of the balancing chamber, whereby the injection of the fuel is carried out. Such a structure will now be further described. A casing 31 of an injector 30 is provided therein with a guide bore 32, a fuel storage chamber 33 and a control volume, i.e. a balancing chamber 32. A needle valve 35 is provided slidably in the guide bore 31 The needle valve 35 comprises a larger-diameter portion 36, and a smaller-diameter portion 37 integral with the larger-diameter portion 36, and a needle 38 is provided on a lower end of the smaller-diameter portion 37. The casing 31 is provided with a hole type injection nozzle 39 (refer to FIG. 11), and the injection nozzle 39 has injection holes 40 at a lower end portion thereof. The injection nozzle 39 is also provided with a seat 41 on an inner surface of its lower end portion, and, when the needle 38 of the needle valve 35 sits on the seat 41, the injection holes 40 are closed. In the hole type injection nozzle 39, the fuel collected in a passage, which extends from the seat 41 to a combustion chamber, after the valve is closed is ejected (after-dripping) in some cases due to the high temperature and pressure variation in the combustion chamber, and the fuel becomes an unburnt gas to cause the HC in an exhaust gas to increase. Therefore, it is necessary that the volume (sack volume 49) of a space extending from the seat 41 to the injection ports 40 be set as small as possible.

The casing 31 has a supply port 42 for introducing a high-pressure fuel from an accumulating pipe (not shown) into the interior thereof, and a flow passage communicating with this supply port 42 branches into two flow passages 43, 44, one flow passage 43 communicating with the balancing chamber 34 via an orifice B, the other flow passage 44 communicating with the fuel storage chamber 33. The casing 31 further has an orifice A allowing communication of the balancing chamber 34 with the outside.

The casing 31 is provided with a solenoid valve 45 for opening and closing the orifice A. The high-pressure fuel introduced from the supply port 42 enters the balancing chamber 34 and fuel storage chamber 33 and works on the needle valve 35. When the solenoid valve 45 is in an OFF-state, the orifice A (discharge passage 46) is closed therewith. In the meantime, the high-pressure fuel is supplied to the balancing chamber 34 and fuel storage chamber 33, so that the needle valve 35 is pressed against an inner lower surface of the injection nozzle due to a difference in the areas on which a pressure is exerted of the needle valve 35 with the injection ports 40 thereby put in a closed state. When a solenoid 47 of the solenoid valve 45 is excited, a valve disc 48 is attracted thereto, and the orifice A is opened, so that the pressure in the balancing chamber 34 decreases. When a needle valve lifting force based on the pressure in the fuel storage chamber 33 becomes larger than a needle valve lowering force based on the pressure in the balancing chamber, the needle valve 35 moves up, and the injection holes 40 are opened, the injection of the fuel starting. When the solenoid 47 of the solenoid valve 45 is then deenergized, the valve disc 48 closes the orifice A, and the fuel pressure in the balancing chamber 34 increases instantly by the high-pressure fuel introduced through the orifice B. Consequently, the needle valve 35 lowers, and the injection ports 40 are closed, the injection of the fuel stopping. When the orifice A is dosed by putting the solenoid valve 45 in an OFF-state, to instantly increase the fuel pressure in the balancing chamber 34, a flow of the fuel leaving the fuel storage chamber 33, passing through the injection nozzle 39 and injected from the injection ports 40 occurs, and, therefore, the fuel pressure becomes gradually low toward the lower end of the injection nozzle 39 due to the resistance of an annular fuel flow passage formed between the smaller-diameter portion 37 of the needle valve 35 and the portion of an inner surface of the casing 31 which is around the same portion 37 of the needle valve. Accordingly, a generally lowering force is exerted on the needle valve 35 on the basis of the high fuel pressure in the balancing chamber 34, the fuel pressure in the fuel storage chamber 33 and the fuel pressure on the seat 41, so that the needle valve 35 is closed.

FIG. 9 is a schematic diagram showing a fuel supply system in a conventional accumulator fuel injection apparatus. The orifices A, B are fixed orifices (the inner diameters dA.dB of the orifices A, B are constant), and the orifice A is set larger than the orifice B (dA>dB). Accordingly, a flow rate of a fuel flowing out from the orifice A is determined by the size of the orifice B. The lift of the needle valve 35 attains a peak when an injection rate is not lower than a certain level.

FIG. 10 is a graph showing the relation between the area characteristics of injection holes of an injector used for a diesel engine, i.e. the lift of a needle valve 35 in the injector and an effective opening area of an injection nozzle 39. Although when the lift is low, i.e., when the lift of the needle valve 35 is low, the effective opening area of the injection nozzle 39 increases in accordance with the size of a clearance between a needle 38 and a seat 41, when the area of the clearance exceeds that of the injection ports 40, the effective opening area becomes constant irrespective of the lift of the needle valve 35.

A conventional example shown in FIG. 12 is an example (which will hereinafter be referred to as a second conventional example, in which the structural elements equivalent to those of the first conventional example are designated by the same reference numerals, whereby repeated detailed descriptions of the elements are omitted), in which a return spring 52 for exerting a lowering force on a needle valve 35 is provided so that an effect in closing the needle valve 35 is obtained more reliably not by depending upon the flow passage resistance alone when a solenoid valve is in an OFF-state. The needle valve 35 in the second example comprises a larger-diameter portion 36, a smaller-diameter portion 37 and a diameter-reduced portion 50 formed in the larger-diameter portion 36. The return spring 52 is held in a low-pressure portion 51 formed between a casing 31 and the diameter-reduced portion 50. The end portion of the return spring 52 which is on the side of the larger-diameter portion 36 is engaged with a spring seat 53 supported on a shoulder portion, which is in the low-pressure portion 51, of the casing 31, while the end portion of the return spring 52 which is on the side of the smaller diameter portion 37 is engaged with a spring seat 54 supported on a lower shoulder portion of the diameter reduced portion 50. The return spring 52 constantly urges the needle valve 35 in the closing direction, and has an effect in preventing the after-dripping of the fuel from an injection nozzle by speedily carrying out the closing of the needle valve 35. The fuel leaking out into the low-pressure portion 51 is recovered by a fuel tank through a flow passage 55. A flow passage 43 extending from a supply port 42 communicates with a balancing chamber 34 via a flow passage 56, which is formed in the larger-diameter portion 36, and an orifice C (corresponding to the orifice B in the Conventional example shown in FIG. 8, and having a diameter d ) Even when a sufficient valve-closing effect cannot be obtained with a valve closing force with which a fuel pressure works on the needle valve 35 and a valve opening force balanced with each other, the return spring 52 closes the needle valve 35 reliably.

The performance level with respect to the fuel consumption, output horsepower and exhaust gas which is required for an engine in recent years has increased. In order that an engine meets a high level of various kinds of performance, it is demanded that an amount of a fuel injected per unit time from injection ports, i.e. a fuel injection rate be controlled finely in accordance with conditions such as an engine load. As the basic techniques for meeting the demand, it is necessary to enable the lift of a needle valve to be controlled at least in a plurality of stages.

The controlling of a fuel injection rate in an initial stage of fuel injection, i.e. an initial injection rate may be given as an example of a fine fuel injection rate controlling operation. When an initial injection rate is high, combustion noise and NOx occur.

In order to carry out an optimum fuel injection rate control according to the engine speed and the load condition, it is necessary that the lift of the needle valve can be controlled accurately, i.e., a half lift control operation for retaining the needle valve in a half lifted state can be carried out. However, the injectors as in the first and second conventional examples are adapted to fully lift or seat the needle valve 35 from or on the seat 41 by operating the solenoid valve on or off, and they are not so formed that a half lifted condition can be precisely controlled.

Another injector (which will hereinafter be referred to as a third conventional example) in which the controlling of an initial injection rate is done by employing a mechanism capable of varying the number of injection ports has been proposed (refer to, for example, Japanese Utility Model Laid-Open No. 142170/1982).

In a hole type injection nozzle 39 shown in FIG. 11, a distance d between a needle 38 and a seat 41 is small when the lift is low (in a position of solid lines), and, therefore, the seat 41 in a fuel injection passage extending from a supply port 42 to injection ports 40, from which the fuel is injected, via a fuel storage chamber 33 constitutes the largest restriction. When the needle valve is fully lifted (in a position of broken lines), the opening area at the seat 41 is larger than that of the injection ports, so that the effective opening area is naturally determined by the opening area of the injection ports 40. However, when the lift is low, the opening area at the seat 41 is smaller than that of the injection ports 40, so that the effective opening area is determined by the opening area at the seat 41. Therefore, when the lift is low, the pressure of the injected high-pressure fuel, i.e. a fuel pressure P2 becomes lower than that (common rail pressure) P1 working on the needle valve 35 (P2<P1). Namely, the actual injection pressure P2 produced when the lift is low becomes lower than a required injection pressure P1, i.e., low-pressure injection is carried out. Consequently, the atomization of the fuel is not attained, and smoke increases.

As shown in FIG. 13, a variable-number-of-injection-port mechanism 12 has a plurality of injection ports 14a, the diameter of which is smaller than that of the conventional injection ports 40, in a cylindrical portion 13 formed at a lower end part of an injection nozzle 11, the injection ports 14 being arranged in the direction (refer to an arrow C) in which a needle valve 6 is lifted. These injection ports 14a are formed so that a total opening area thereof becomes larger than that of the conventional injection ports. Since the injection ports 14a are formed so that they are all closed at an outer circumferential surface 6a of the needle valve 6 when a needle 9 of the needle valve 6 engages a seat 15, the after-dripping rarely occurs. The needle valve 6 is provided at a lower end portion thereof with an oil feed port 16, which communicates with a passage 18 formed in a diameter-reduced portion 17 of the needle valve 6.

According to the variable-number-of-injection-port mechanism 12, when the needle valve 6 is lifted, a fuel storage chamber 4, passage 18 and oil feed port 16 communicate with one another, and the closed injection ports 14a are opened sequentially in accordance with the lift of the needle valve 6. For example, when the lift of the needle valve 6 is S1, the lower injection ports 14a only are opened, and, when the lift of the needle valve 6 is S2, not only the lower injection ports 14a but also the upper injection ports 14a are opened. Therefore, according to the variable-number-of-injection-port mechanism 12, the opening area of the opened injection ports 14a in an initial stage in which the lift of the needle valve is low is smaller than that of the conventional injection ports in the same condition, so that an initial injection rate can be minimized.

The mechanism 12 is also suitably used when the pilot injection is carried out. In a fuel injection apparatus adapted to inject a fuel, which is required for one combustion of an internal combustion engine, in a plurality of shots, the injection (pilot injection) of a very small amount of fuel is carried out in some cases when a fuel ignition delay has to be prevented, prior to the main injection in which a greater part of the fuel is injected. The mechanism 12 is suitably used when such pilot injection is carried out.

In the injector of the third conventional example provided with a mechanism 12, the opening area of each injection port 14a is smaller than that of each injection port 40 of the first conventional example. Accordingly, even when the lift of the needle valve is low, the effective opening area is determined by the opening area of the injection ports 14a, and the initial injection rate can be controlled to be low. However, in the injector of the third conventional example, it is necessary that the half lift condition of the needle valve 6 can be controlled. Therefore, it is impossible to use this injector in combination with the injectors of the first and second conventional examples in which the half lift condition of the needle valve cannot be controlled.

The pressure balancing type injectors in which the controlling of the half lift condition of a needle valve is done include an injector (which will hereinafter be referred to as a fourth conventional example. Refer to, for example, Japanese Patent Laid-Open No. 161165/1990) in which the resilient force of return springs of different loads is exerted on the needle valve in order, whereby a half lift condition of the needle valve is temporarily created. The needle valve is formed of a smaller-diameter piston and a larger-diameter piston, and the pilot injection can be carried out by the lifting of the smaller-diameter piston prior to the main injection based on the lifting of the larger-diameter piston.

The means for half lifting a needle valve include a means for exciting a solenoid valve for only a very short period of time (which will hereinafter be referred to as a fifth conventional example. Refer to, for example, Japanese Patent Laid-Open No. 159184/1994.). This means is adapted to shut off a solenoid valve so as to close a discharge passage as soon as this passage is opened by energizing the solenoid valve. Owing to such a control operation, a fuel pressure is applied to a balancing chamber with the needle valve in a half lifted state before the needle valve is fully lifted, to cause the needle valve to be seated.

However, in the fourth and fifth conventional examples, the half lifted state of the needle valve cannot be retained, though the half lifted state can be temporarily obtained. Moreover, when such a half lifting means is used, the lift of the needle valve scatters due to the influence of the actual fuel pressure, so that it is difficult to precisely control the half lifted state of the needle valve. In addition, the on and off control of the solenoid valve have to be repeated in a short period of time. Therefore, a high-performance solenoid magnetic valve is required, and this causes the manufacturing cost to increase.

Therefore, an object of the present invention is to solve these problems, and provide a pressure balancing type accumulating fuel injection apparatus capable of controlling the lift of a needle valve precisely, retaining a half lifted state of the needle valve, and satisfying the requirements for a high performance level of the apparatus with respect to an engine developed in recent years.

Another object of the present invention is to provide an accumulating fuel injection apparatus formed so that the half lifted state of a needle valve can be controlled precisely, and capable of controlling an initial injection rate which allows the minimization of the occurrence of combustion noise and emission of HC and NOx to be attained.

DISCLOSURE OF THE INVENTION

The present invention relates to an accumulating fuel injection apparatus having a needle valve adapted to open and close an injection nozzle provided with injection ports in a lower portion thereof, a balancing chamber adapted to apply a fuel pressure to the needle valve, a supply passage for supplying a fuel from a fuel supply port to the balancing chamber, a discharge passage for discharging the fuel from the balancing chamber, a solenoid valve adapted to open and close the discharge passage, and a lift control means for controlling the lift of the solenoid valve, characterized in that the lift of the solenoid valve is increased and decreased by a control operation of the lift control means, an opening area of the discharge passage being increased and decreased in accordance with the lift of the solenoid valve, the opening area of the supply passage and the degree of opening of the injection nozzle being increased and decreased in accordance with the lift of the needle valve.

*The solenoid valve acts as a variable lift valve.*

In this accumulating fuel injection apparatus, the lift of the solenoid valve can be controlled, so that an opening area of the discharge passage, i.e. an amount of discharge per unit time of the fuel from the balancing chamber can also be controlled in a stepped manner. This enables the controlling of an amount of the fuel flowing into the balancing chamber through the supply passage of a predetermined opening area to be done so that this amount corresponds to the mentioned amount of discharge, i.e., the controlling of the lift of the needle valve which determines the opening area of the supply passage to be done as well. Accordingly, the degree of opening of the injection nozzle opened and closed with the needle valve, i.e. the injection rate of the fuel from the injection nozzle can be controlled with a high accuracy. Moreover, the half lifted condition of the needle valve can be retained by an operation of the solenoid valve, and the controlling of the fuel injection time can also be done easily.

The lift control means is adapted to deenergize or energize the solenoid, whereby the control means can be used as a stopper limiting the motion of the valve disc of the solenoid valve in at least two positions. In this case, the stopper limits the motion of the valve disc of the solenoid valve in at least two positions by a simple method, i.e., the deenergization or energization of the solenoid, and the fuel injection rate can thereby be controlled in at least two stages, i.e., at higher and lower levels.

When a groove type passage formed between the needle valve and a valve casing, which is adapted to guide the needle valve slidingly, is included in the supply passage, the opening area of an orifice at which the groove type passage faces the balancing chamber increases and decreases in accordance with the lift of the needle valve, so that the lift of the needle valve can be controlled accurately and stably.

The degree of opening of the injection nozzle may be controlled in accordance with the lift of the needle valve away from the seat in a position just on the upstream side of the injection ports and the opening area of the injection ports adapted to be opened by the needle valve, or in accordance with the number of injection ports actually opened by the needle valve when the injection ports comprise a plurality of rows of injection ports. Accordingly, the degree of opening of the injection nozzle is low when the lift of the needle valve is low, and becomes highest when the needle valve is fully lifted.

When the lift of the needle valve in the accumulating fuel injection apparatus and an engine load are set correlative, the fuel injection rate in a low-load condition can be set low by reducing the opening area of the discharge passage, and that in a high-load condition can be set high by increasing the opening area of the discharge passage.

When the fuel passage, which extends to the injection ports formed at a lower end portion of the injection nozzle, in the accumulator fuel injection apparatus has a flow passage resistance high enough to lower the fuel pressure when a fuel flow exists, a force working on the needle at the lower end portion of the needle valve to lift the needle valve can be reduced at such time that equal fuel pressure is applied to the balancing chamber and injection nozzle by closing the discharge port with the solenoid valve deenergized. This enables the closing of the needle valve to be done reliably.

When a return spring urging the needle valve in the closing direction thereof is provided between the needle valve and casing in this accumulating fuel injection apparatus, the needle valve receives, when the discharge port is closed by deenergizing the solenoid valve, a high fuel pressure occurring momentarily in the balancing chamber, a fuel pressure in the fuel storage chamber and a fuel pressure occurring on the seat in accordance with the respective pressure receiving surface area. Even when a difference between a force based on a fuel pressure and working in the valve closing direction and a force based on the fuel pressure and working in the valve opening direction is small, so that a sufficiently large valve closing force cannot be obtained, the needle valve can be closed reliably since the return spring urges the needle valve constantly in the valve closing direction. When the discharge passage is opened by energizing the solenoid valve, the fuel is discharged from the balancing chamber whether the needle valve is half lifted or fully lifted. Therefore, the pressure in the balancing chamber lowers, and the injection ports are opened by the needle valve. Owing to the positive urging force in the valve closing direction of the return spring, a speedy valve closing action of the needle valve can be obtained, and the after-dripping of the fuel can be prevented.

BEST MODE FOR CARRYING OUT THE INVENTION

The embodiments of the accumulating fuel injection apparatus according to the present invention will now be described with reference to the drawings. A first embodiment of the accumulating fuel injection apparatus according to the present invention will now be described with reference to FIGS. 1 and 2.

Figure 1:
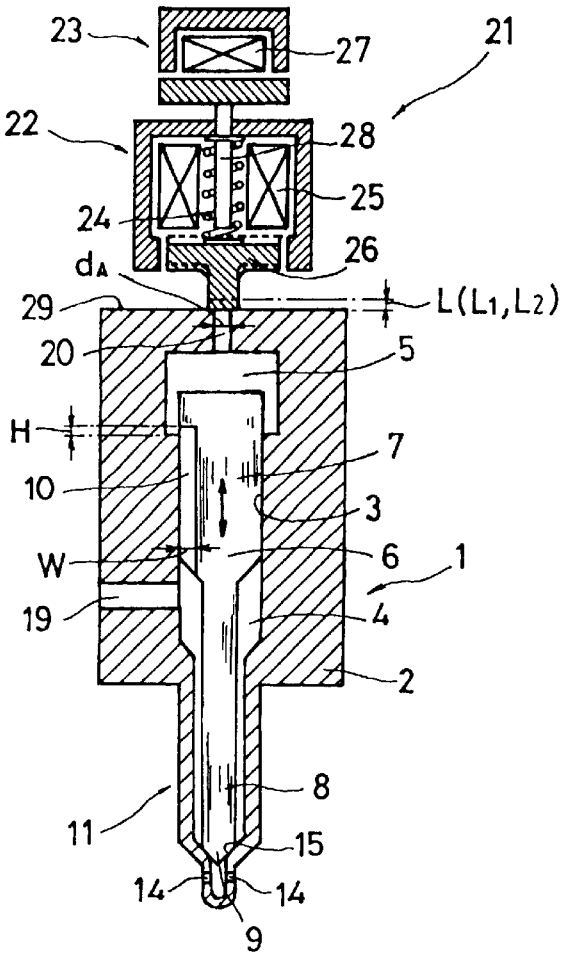
FIG. 1 is a schematic diagram showing a first embodiment of the accumulating fuel injection apparatus according to the present invention.

As shown in FIG. 1, a casing 2 for an injector 1 is provided therein with a guide bore 3, a fuel storage chamber 4, and a control volume, i.e. a balancing chamber 5. A needle valve 6 is provided slidably in the guide bore 3. The needle valve 6 comprises a larger-diameter portion 7 fitted slidably in the guide bore 3, and a smaller-diameter portion 8 made integral with the larger-diameter portion 7. The larger-diameter portion 7 of the needle valve 6 is provided with a slit 10 communicating the balancing chamber 5 and fuel storage chamber 4 with each other and extending axially. The slit 10 faces the interior of the balancing chamber 5 with the needle valve closed, with an opening area corresponding to a height H, and communicates with the balancing chamber 5. As the needle valve 6 is lifted, the height H of the slit 10 increases. The slit 10 is formed in the needle valve 6 instead of the orifice B in the first conventional example. Unlike the orifice in the first conventional example, the slit can be formed without requiring the balancing chamber 5 to be subjected to a machining process. Accordingly, the number of parts can be reduced, and the forming of the slit can be done simply. The height H is sufficiently smaller than a depth w of the slit 10 of the needle valve 6.

The injector 1 is provided with an injection nozzle 11 at a lower end portion thereof. In the injection nozzle 11, a conical needle 9 is formed at a lower end of the smaller-diameter portion 8, the needle 9 being adapted to cooperate with a seat 15 formed on the inner side of a lower end portion of the casing 2. As the needle 9 is lifted from the seat 15, the fuel is injected from injection ports 14 formed in a lower end portion of the injection nozzle 11, and the injection of the fuel is stopped when the needle 9 sits on the seat 15.

The casing 2 has a supply port 19 for introducing a high-pressure fuel from an accumulating pipe (not shown) into the interior of the casing, and the supply port 19 communicates with the fuel storage chamber 4, which communicates with the balancing chamber 5 via the slit 10. The supply port 19, fuel storage chamber 4 and slit 10 form a supply passage in the injector 1. The supply passage is restricted at an upper end portion of the slit 10. As the needle valve 6 is lifted, the height H of the slit 10 increases, and the opening area of the supply passage increases accordingly. The casing 2 is provided with an orifice A (discharge passage 20) for discharging the fuel from the balancing chamber 5. The fuel stored in the fuel storage chamber 4 passes through a narrow and sufficiently long annular passage formed between the smaller-diameter portion 8 and injection nozzle 11 while the fuel flows to the lower end of the smaller-diameter portion, so that the fuel receives a conduit resistance to cause the pressure thereof to decrease.

A lift control mechanism 21 constituting a lift control means is provided on an upper portion of the casing 2. The lift control mechanism 21 comprises a combination of a conventional solenoid valve 22 for opening and closing an orifice A (discharge passage 20), and a lift controller 23 adapted to control the lift of a valve disc 26 of the electromagnetic valve 22. The solenoid valve 22 is urged by a spring 24 toward the casing 2, and has the valve disc 26 attracted to a solenoid 25, the orifice A being closed with the valve disc 26 when the solenoid valve 22 is not in an ON-state. When the solenoid valve 22 is energized, it is lifted, i.e., the valve disc 26 is lifted to open the orifice A, so that the fuel pressure in the balancing chamber 5 is discharged.

The lift control mechanism 21 has a stopper 28 adapted to restrict the movement of the valve disc 26 in two positions in accordance with the deenergization or energization of a solenoid 27. Accordingly, the lift of the solenoid valve 22, i.e. a traveling distance L of the valve disc 26 from an upper surface 29 of the casing can be switched in two stages from L1 to L2, and vice versa in accordance with the position of the stopper 28.

This accumulating fuel injection apparatus employs the lift control mechanism 21 to make it possible to switch the lift of the solenoid valve 22 in two stages, and vary the opening area (height H of the slit 10) of the orifice B, and this enables the lift of the needle valve 6 as well to be switched in two stages with a high accuracy. The reasons for the switching will now be given as follows.

First, when the solenoid valve 22 is lifted by a height L1 which satisfies the following expression, $$\pi dAL1<\pi dA^2/4$$

the high-pressure fuel in the control volume 5 is discharged from the orifice A. During this time, a flow rate Q1 of the fuel passing through the orifice A is:

$$Q1=C1\ \pi dAL1\cdot[2(PCV-PO\gamma\rho]^{1/2}$$

Therefore, the pressure in the balancing chamber decreases, and the needle valve 6 is lifted. During this time a flow rate Q2 of the fuel passing through the slit is:

$$Q2=C2bH1\cdot[2(PCR-PCV\gamma\rho]^{1/2}$$

When the flow rate Q2 of the fuel passing through the slit becomes equal to that Q1 of the fuel passing through the orifice A, i.e., when Q2=Q1.

the pressure in the fuel storage chamber 4 and that in the balancing chamber 5 are balanced, and the lifting of the needle valve 6 is stopped. At this time, the lift of H1−H0 is obtained.

When the solenoid valve 22 is lifted by a height L2(>L1) which satisfies the following expression, $$\pi dAL2\geqq\pi dA^2/4$$

a flow rate Q1' of the fuel passing through the orifice A is:

$$Q1'=(C1\pi da^2/4)[2(PCV-PO\gamma\rho]^{1/2}>Q1$$

Accordingly, the needle valve 6 is lifted to a height H2 at which the relation, $$Q2'=C2bH2[2(PCR-CV\gamma\rho]^{1/2}=Q1'$$

is established between the flow rate Q2' of the fuel passing through the slit and that Q1' of the fuel passing through the orifice A.

The following expression can be obtained by substituting the above and Q2=Q1 and Q2'=Q1' for the above expression Q1'>Q1:

$$H2>H1$$

Such being the case, this accumulating fuel injection apparatus becomes able to switch the lift of the needle valve 6 in two stages (H1, H2) with a high accuracy.

The letters in the above expressions represent the following.

b: width of the slit 10 dA: inner diameter of the orifice A (discharge passage 20)

PO: pressure in the orifice A (discharge passage 20)–approximately 2–4 bar

PCV: pressure in the balancing chamber

PCR: pressure in the supply port 19 (=common rail pressure)

C1: flow coefficient of the orifice A

C2: flow coefficient of the slit 10

ρ: density of the high-pressure fuel

Figure 2:
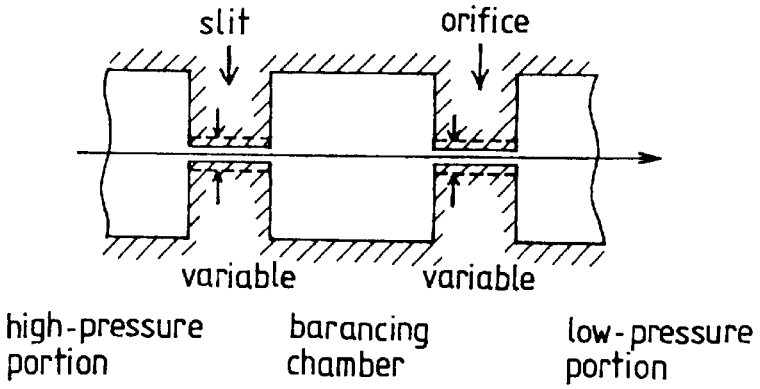
FIG. 2 is a schematic diagram showing a fuel supply system in the accumulating fuel injection apparatus shown in FIG. 1.
Figure 9:
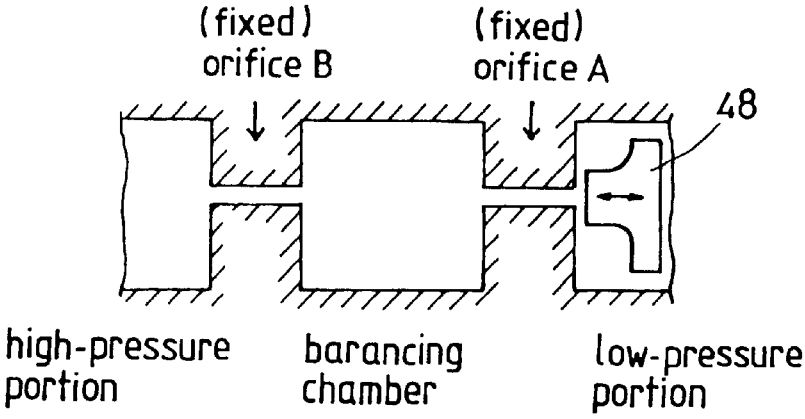
FIG. 9 (PRIOR ART)
FIG. 9 is a schematic diagram showing a fuel supply system in the conventional accumulating fuel injection apparatus.
Figure 10:
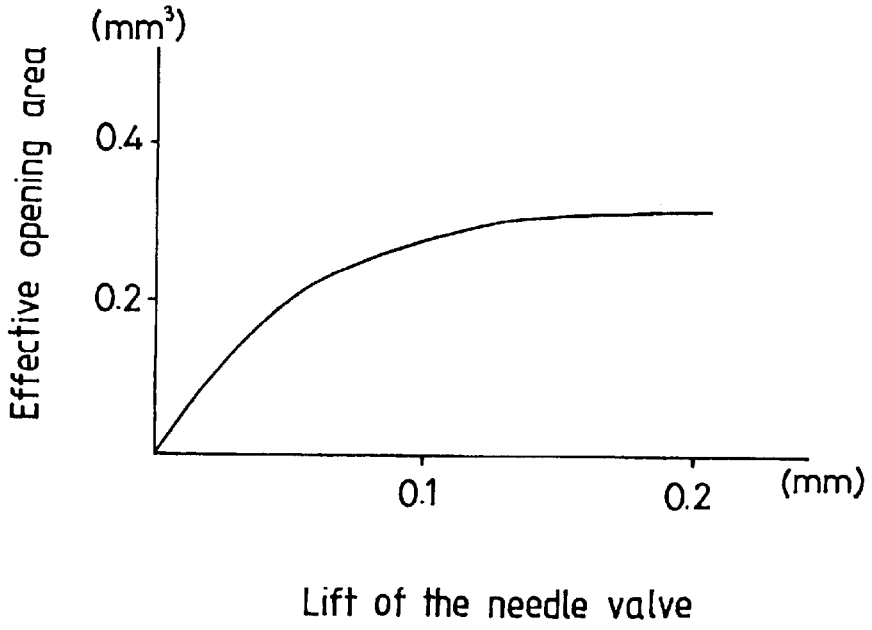
FIG. 10 (PRIOR ART)
FIG. 10 is a graph showing the ares characteristics of the injection ports of an injector used in a conventional diesel engine.
Figure 11:
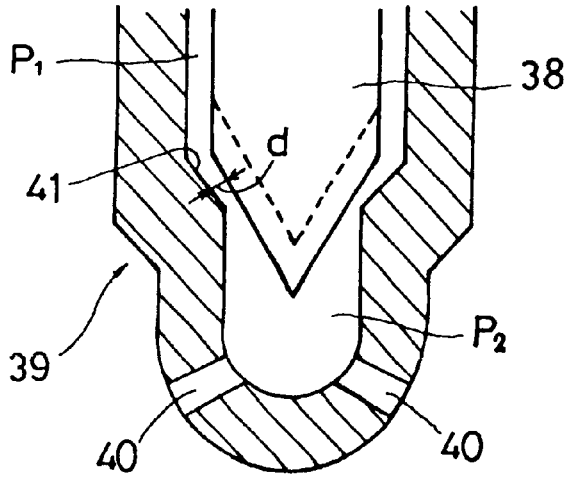
FIG. 11 (PRIOR ART)
FIG. 11 is a sectional view of a hole type nozzle in a conventional accumulating fuel injection apparatus.

As seen in the fuel supply system in the accumulating fuel injection apparatus schematically shown in FIG. 2. the solid lines and broken lines represent cross section areas of the slit and orifice at a lower lift L1 and a higher lift L2 respectively. The difference between the slit and orifice shown in FIG. 2 and those shown in FIG. 9 resides in that the former slit and orifice are both formed variably.

Figure 3:
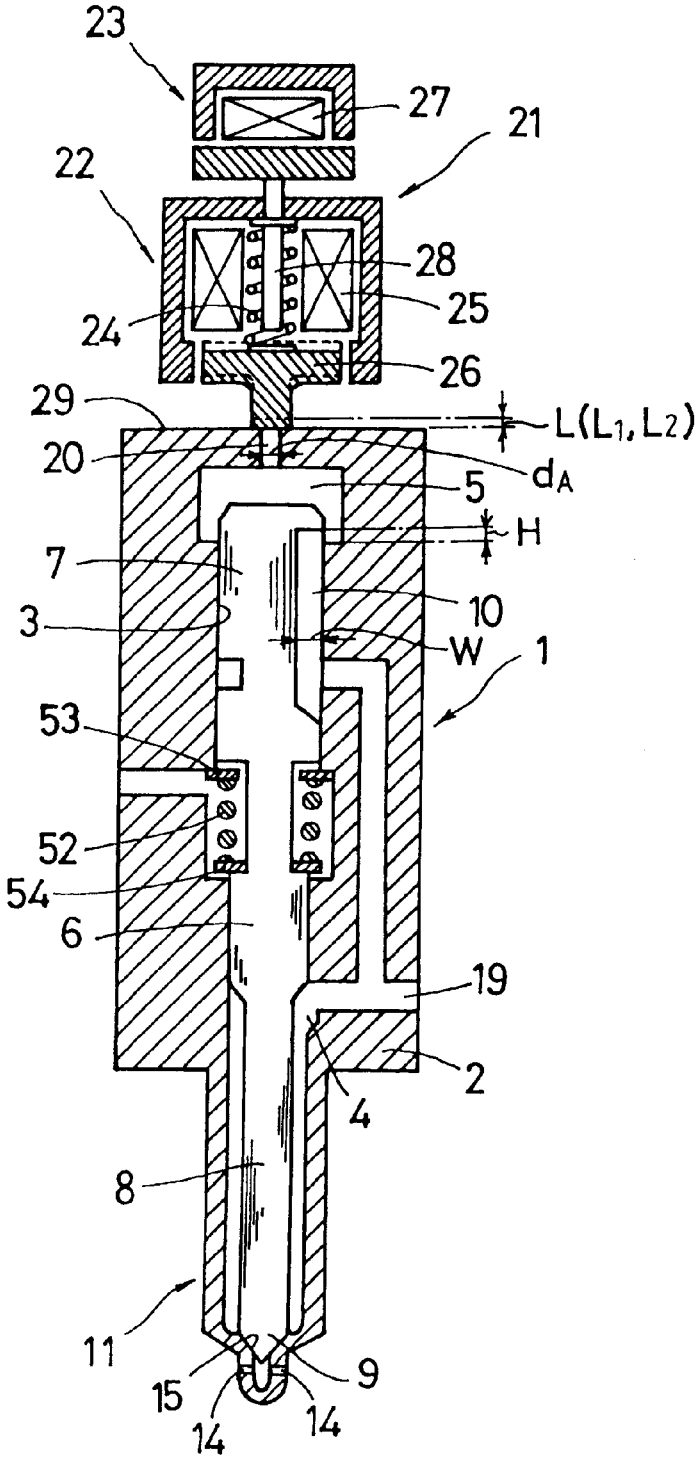
FIG. 3 is a schematic diagram showing a second embodiment of the accumulating fuel injection apparatus according to the present invention.
Figure 12:
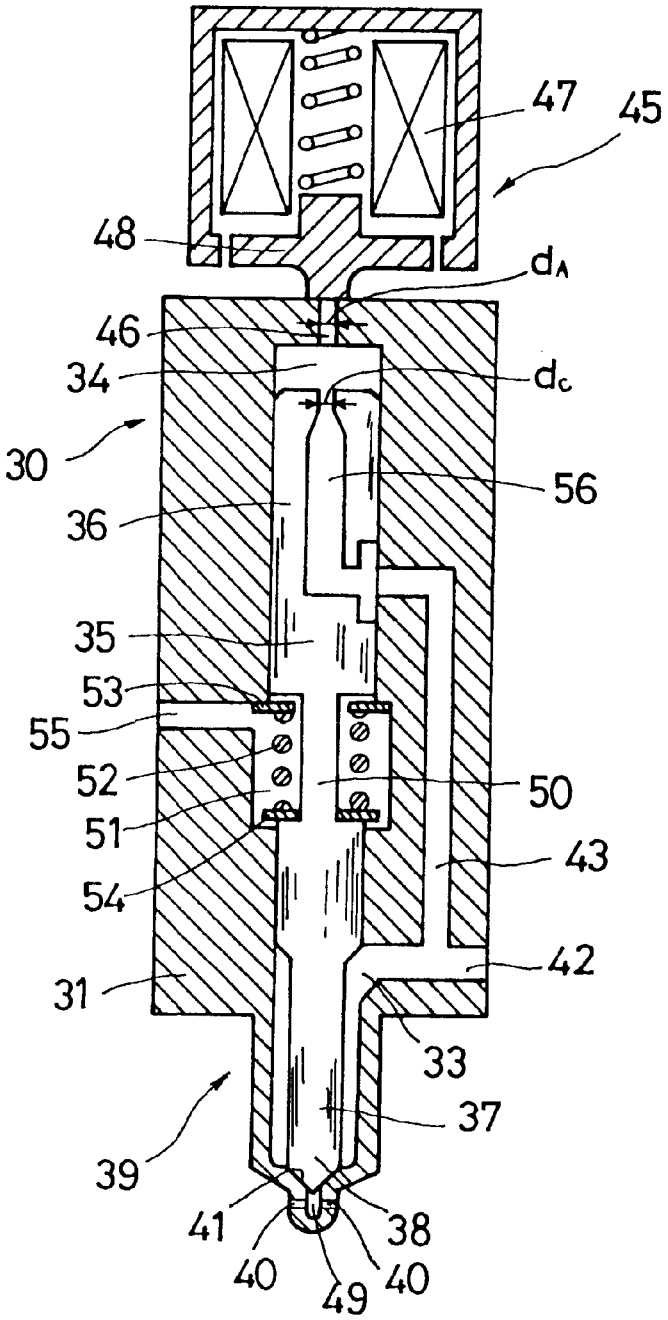
FIG. 12 (PRIOR ART)
FIG. 12 is a schematic diagram showing another example of a conventional accumulating fuel injection apparatus.

In the second embodiment shown in FIG. 3 of the accumulating fuel injection apparatus according to the present invention, the constituent elements identical with or equivalent to those of the embodiment of FIG. 1 are designated by the same reference numerals, and repeated descriptions thereof are omitted. In the second embodiment, a needle valve 6 is urged by a return spring 52 in the same manner as in the apparatus shown as a conventional example in FIG. 12. In the second embodiment, a valve-closing action is not depended upon the flow passage resistance alone unlike a similar action in the embodiment of FIG. 1 but a speedy valve-closing action is obtained by a positive urging force of a spring with an action to close the needle valve 6 made reliably when a solenoid valve 22 is in an OFF-state. Since the detailed construction of the return spring 52 is identical with that of the return spring shown in FIG. 12, the description thereof is omitted.

Figure 4:
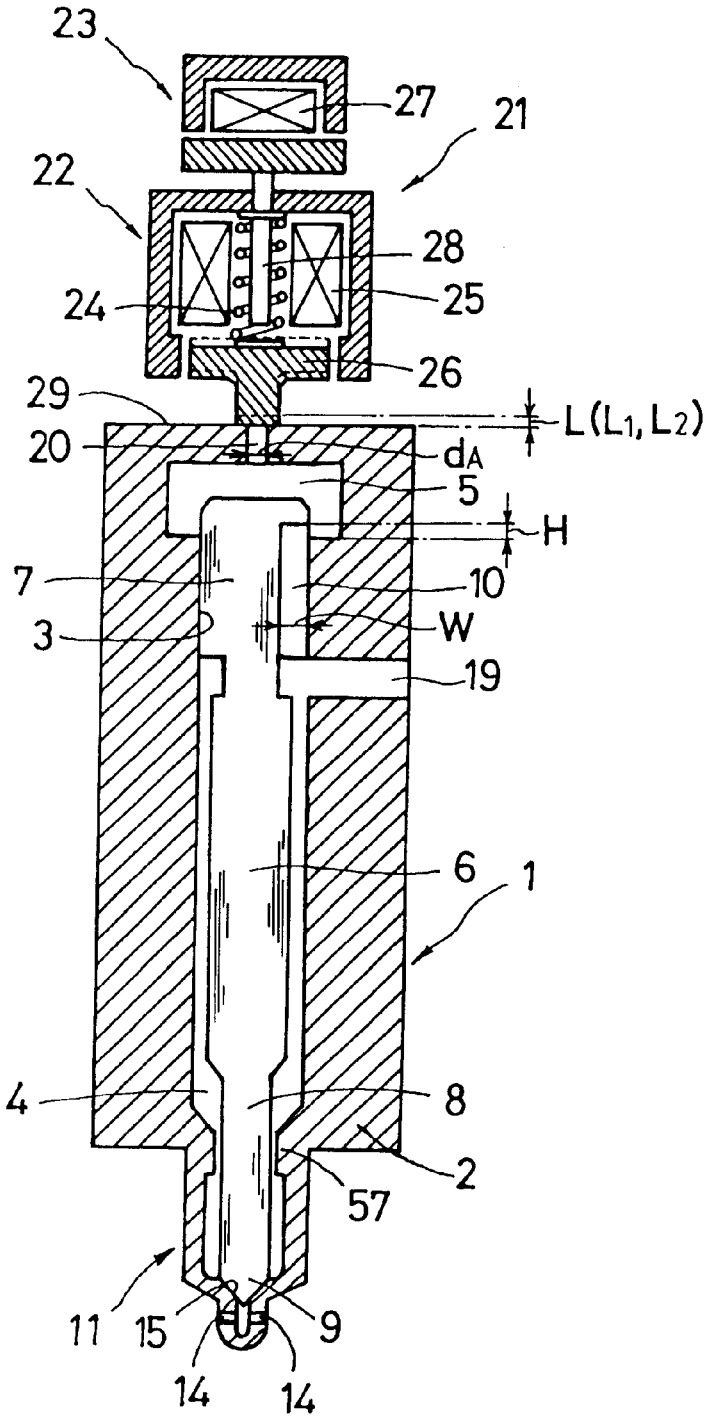
FIG. 4 is a schematic diagram showing a third embodiment of the accumulating fuel injection apparatus according to the present invention.

The third embodiment shown in FIG. 4 of the accumulating fuel injection apparatus according to the present invention is provided with a restriction 57 in a fuel supply passage extending from a fuel supply port 19 to an injection nozzle 11, i.e. an annular supply passage formed between a smaller-diameter portion of a needle valve and the portion of an inner surface of a casing which is around the smaller-diameter portion. Owing to this arrangement, when a fuel flows in the fuel supply passage extending from the fuel supply port 19 to the injection nozzle 11, a pressure drop occurs in the fuel in the restriction 57, and the resultant pressure works on a seat 15, so that a force imparted to a needle valve 6 in the valve opening direction becomes smaller. Therefore, when the fuel pressure in a balancing chamber 5 decreases momentarily by an operation of a valve 22, the needle valve 6 can be closed reliably on the basis of a differential pressure working thereon. Since the constituent elements of this embodiment which are identical with or equivalent to those of the embodiments of FIGS. 1 and 3 are designated by the same reference numerals, the descriptions thereof are omitted.

Figure 5:
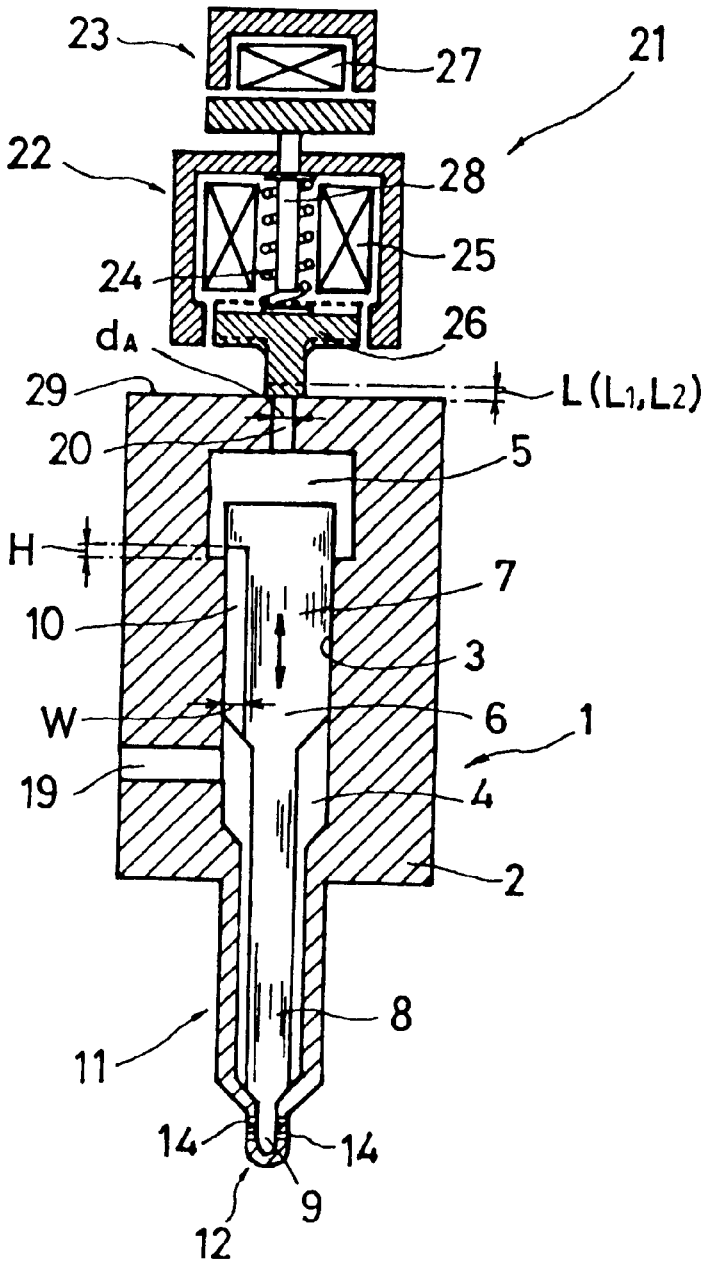
FIG. 5 is a schematic diagram showing a fourth embodiment of the accumulating fuel injection apparatus according to the present invention.

In a structure including injection ports and needle, a variable-number-of-injection-port mechanism 12 shown in FIG. 5 can be employed. An injection nozzle 11 provided with a variable-number-of-injection-port mechanism 12 constituting a variable-number-of-injection-port means is formed in a casing 2. The injection nozzle 11 can employ the structure shown in detail in FIG. 13, and a repeated description of the same is omitted. The mechanism 12 may have any shape as long as the opening area thereof increases in accordance with the lift of the needle valve 6, or as long as the number of the injection ports can be changed (the number of the injection ports opened can be increased), and it is not limited to the structure shown in FIG. 13. For example, the injection ports 14 may comprise slit type ports extending in the direction in which the needle valve is lifted, and capable of varying the area thereof so that the openings of the slit type ports are closed in accordance with the lift of the needle valve 6.

Figure 13:
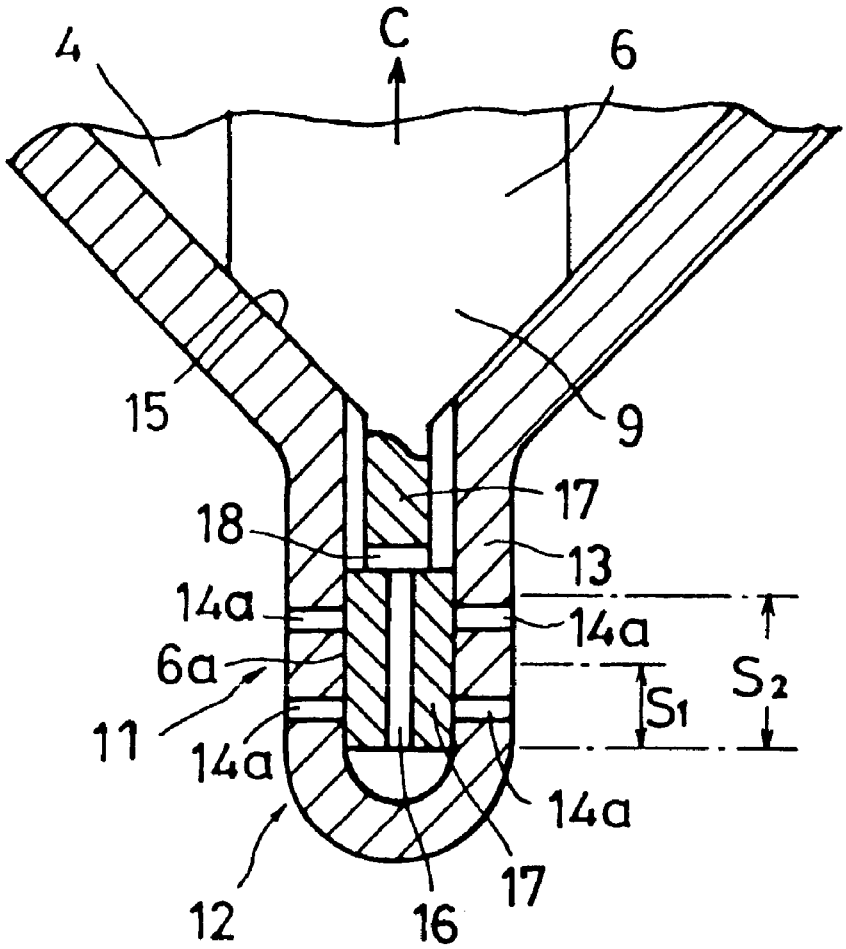
FIG. 13 is a sectional view of an injection nozzle employing a variable-number-of-injection-port mechanism.

According to this accumulating fuel injection apparatus, the injection ports can be controlled variably when the lift control mechanism 21 for controlling the lift of the needle valve 6 in two stages and a variable-number-of-injection-port mechanism 12 constituting a variable-number-of-injection-port means for switching the number of the injection ports 14 opened from one number to another in accordance with the lift (S1, S2) shown, for example, in FIG. 13 of the needle valve 6 are combined with each other as mentioned above.

Figure 6:
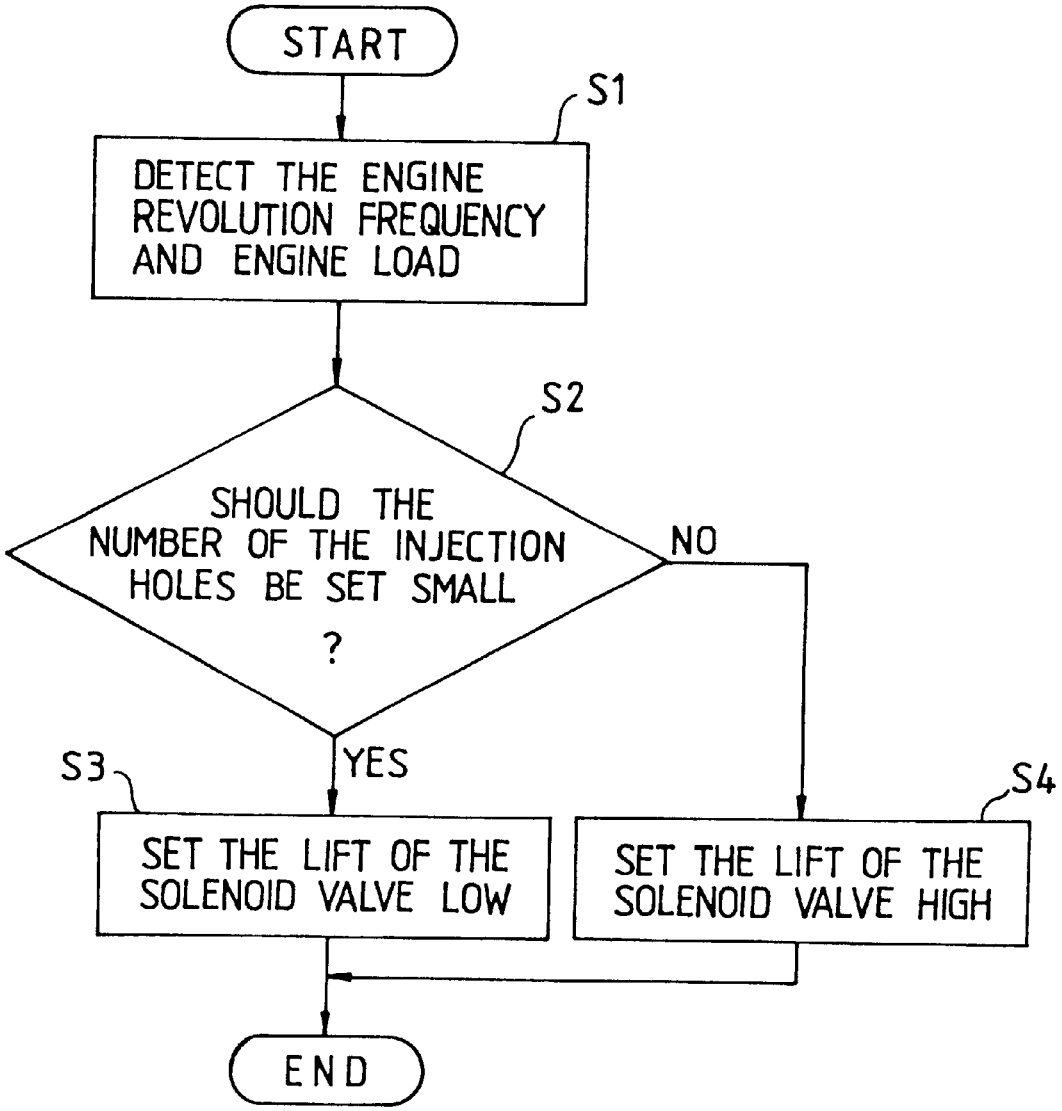
FIG. 6 is a drawing showing an example of a control flow chart for the accumulating fuel injection apparatus of FIG. 5.

FIG. 6 is a process flow diagram showing an example of an operation of this accumulating fuel injection apparatus. In this process flow, the opened condition of the injection ports is changed with respect to the number thereof in accordance with the operation condition of the engine. The load condition of the engine, i.e. the revolution frequency of the engine and a load are detected (step S1), and a judgement as to whether the lift of the solenoid valve 22 should be controlled so that the number of opened injection ports becomes small or large is given (step S2). When a judgement that the number of the injection ports to be opened should be set small (small number of injection ports) is given, the lift of the solenoid valve 22 is set low (lift L=L1), whereby the number of the injection ports to be opened can be set small (step S3). When a judgement that the number of the injection ports to be opened should be set large (large number of injection ports) is given, the lift of the solenoid valve 22 is set high (lift L=L2), whereby the number of the injection ports to be opened can be set large (step S4).

Figure 7:
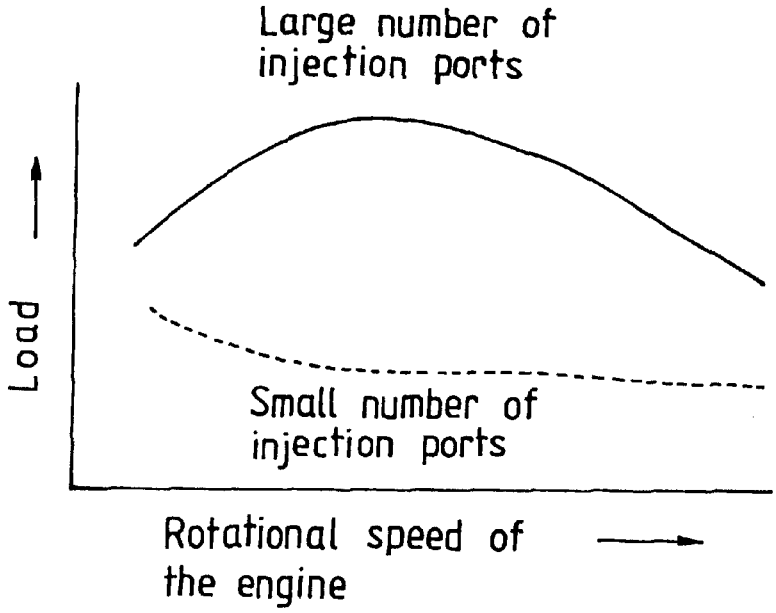
FIG. 7 is a drawing showing an example of a map of the accumulating fuel injection apparatus of FIG. 5.
Figure 8:
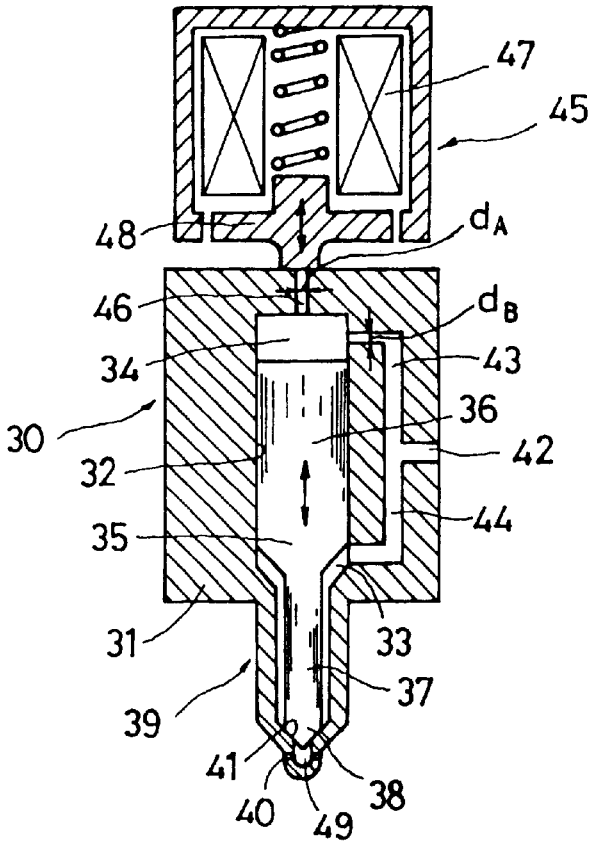
FIG. 8 (PRIOR ART)
FIG. 8 is a schematic diagram of a conventional accumulating fuel injection apparatus.

FIG. 7 shows an example of a map of this accumulating fuel injection apparatus. This map shows a load condition corresponding to the revolution frequency of an engine. This map shows that, when a load at a certain revolution frequency of an engine is in a region not higher than a broken line, the lift controlling should be done so that the number of the injection ports to be opened becomes small, and that, when a load at a certain revolution frequency of the engine is in a region between the broken line and a solid line, the lift controlling should be done so that the number of the injection ports to be opened becomes large. When an injection rate an injection pressure are constant, an initial injection rate attainable with a smaller number of opened injection ports becomes lower. Namely, since the amount of fuel injected during a period of an ignition delay is small, a premixed combustion ratio becomes smaller accordingly, and the occurrence of combustion noise and NOx can be minimized. However, when the number of opened injection ports is small, a total injection time becomes long, so that an absolute flow rate of the fuel is high. When the number of opened injection ports is large, the opening area becomes large, and a fuel injection period becomes short. On a high load side, after-dripping occurs, and smoke and HC increases unless the number of injection ports is set large.

In this accumulating fuel injection apparatus, the lift control mechanism 23 for controlling the lift of the solenoid valve 22 is not necessarily of an electromagnetic type shown in FIG. 1. For example, a mechanism using a piezo-electric element, or a mechanism capable of meeting the purpose by controlling a pulse width of a two way valve driving current may be used.

INDUSTRIAL APPLICABILITY

Since the accumulating fuel injection apparatus according to the present invention is constructed as described above, it is possible to control the lift of the solenoid valve in at least two stages, increase the opening area of the discharge passage in accordance with the lift of the solenoid valve, and increase the lift of the needle valve, i.e. the opening area of the supply passage and the degree of opening of the injection nozzle in accordance with a discharge rate of the fuel corresponding to such an increase in the opening area of the discharge passage. Therefore, the apparatus is useful as an accumulating fuel injection apparatus which can be formed so that the opening of the needle valve in a stepped manner, i.e. the half lifting of the needle valve can be controlled precisely, and which is capable of finely controlling the fuel injection rate and time in accordance with the operation condition of the engine including the load condition thereof. It also becomes possible to control the fuel injection rate and time in an initial stage of fuel injection, i.e. an initial injection rate to be low, and minimize the generation of combustion noise and NOx. When the pilot injection of fuel is carried out, the same effect can be obtained.

In this accumulating fuel injection apparatus, the degree of opening of the injection nozzle is changed in accordance with the variation of the lift of the needle valve which is away from the seat in a position just on the upstream side of the injection ports, and the opening area of the injection ports or the number of small injection ports among a group of injection ports in accordance with the variation of the same lift. This enables the injection rate to be controlled finely, and, especially, the injection rate of a very low flow level to be controlled easily. When the injection rate is very low, the injection period is very short, so that a requirement level of a response of the solenoid valve becomes high. Consequently, the solenoid of the solenoid valve requires to comprise a solenoid of a large ampere-turn having a low inductance and a low impedance. In this accumulating fuel injection apparatus, the controlling of the injection rate can be done easily, and the controlling of the half lifting time, i.e. the operating time of the solenoid valve by an electrical method with ease. Accordingly, a control operation for increasing the injection period when the injection rate is low can also be carried out. Consequently, the level of response demanded by the solenoid valve becomes lower, and the designing of the solenoid valve can be done more easily. When a variable-number-of-injection-port means is employed as a means for increasing the degree of opening of the injection nozzle in this accumulating fuel injection apparatus, the lift of the solenoid valve can be varied during an injection period, so that the controlling of an injection rate, which cannot be done at all in a conventional injection system becomes possible. Moreover, the controlling of both the injection rate waveform and the injection time becomes able to be done freely by designing the orifices, slits and solenoid valve suitably. When the variable-number-of-injection-port means is employed, the pilot injection can be controlled optimumly, and the noise in an idling region can be lowered. Also, the improving the injection characteristics in a low-load region enables the emission of NOx. HC and particulates to be minimized. According to this accumulating fuel injection apparatus, it becomes possible to greatly simplify and miniaturize the structure for controlling the varying of the number of injection ports of the injector, apply the apparatus widely and in common to small-sized engines to large-sized engines by suitably setting the responsiveness of the balancing chamber and solenoid valve, greatly reduce the number of parts exposed to a high pressure, and apply the apparatus to the injection of all pressures of not only the light oil but also any other kinds of fuels.

A fuel pressure works on the needle valve in both the valve opening direction and valve closing direction. When the force based on the fuel pressure in both directions is balanced, it is difficult to close the valve. In such a case, it is preferable to provide a return spring urging the needle valve in the injection nozzle closing direction. In order to urge the needle valve in the injection nozzle closing direction, a throttle is provided in the fuel supply passage extending from the fuel supply port to the injection nozzle. This enables the fuel pressure passed through the throttle to lower, and the injection nozzle to be closed owing to a differential pressure.

I claim:

1. An accumulating fuel injection apparatus comprising an injection nozzle provided with injection ports in a lower end portion thereof, a needle valve adapted to open and close said injection ports, a balancing chamber adapted to apply a fuel pressure to said needle valve, a supply passage for supplying a fuel from a fuel supply port formed in said injection nozzle to said balancing chamber, a discharge passage for discharging the fuel from said balancing chamber, a solenoid valve adapted to open and close said discharge passage, and a means for controlling the lift of said solenoid valve; the lift of said solenoid valve, the opening area of said discharge passage which increases and decreases in accordance with lift of said solenoid valve, the lift of said needle valve which increases and decreases in accordance with the opening area of said discharge passage, the opening area of said supply passage which increases and decreases in accordance with the lift of said needle valve, and the degree of opening of said injection ports which increases and decreases in accordance with the lift of said needle valve being controlled by an operation of said lift control means.

2. An accumulating fuel injection apparatus according to claim 1, wherein said lift control means is a stopper adapted to limit a movement of a valve disc of said valve in at least two positions by deenergizing or energizing a solenoid thereof.

3. An accumulating fuel injection apparatus according to claim 1, wherein said supply passage includes a groove type passage formed between said needle valve and a valve casing guiding said needle valve slidingly, the opening area of said supply passage is an opening area of an orifice at which said groove type passage faces said balancing chamber.

4. An accumulating fuel injection apparatus according to claim 1, wherein the degree of opening of said injection nozzle is increased and decreased in accordance with the lift of said needle valve which is away from a valve seat in a position just on the upstream side of said injection ports.

5. An accumulating fuel injection apparatus according to claim 1, wherein the degree of opening of said injection nozzle is increased and decreased by changing the opening area of said injection ports by said needle valve.

6. An accumulating fuel injection apparatus according to claim 5, wherein said injection ports comprise a plurality of injection ports, the opening area of said injection ports being increased and decreased by changing the number of opened injection ports.

7. An accumulating fuel injection apparatus according to claim 1, wherein said supply passage has a conduit resistance high enough to generate a differential pressure in the direction in which said injection nozzle is closed with respect to a fuel flow.

8. An accumulating fuel injection apparatus according to claim 1, wherein said apparatus is provided with a return spring urging said needle valve in the injection nozzle closing direction.

9. An accumulating fuel injection apparatus according to claim 1, wherein said apparatus is provided with a throttle in said fuel supply passage extending from said fuel supply port to said injection nozzle.

10. An accumulating fuel injection apparatus according to claim 1, wherein the opening area of said discharge passage is set small when a load is low, and large when a load is high.

*11. An accumulating fuel injection apparatus comprising*

*an injection nozzle provided with injection ports in a lower end portion thereof,*

*a first valve comprising a needle valve adapted to open and close said injection ports,*

*a balancing chamber adapted to apply a fuel pressure to said needle valve,*

*a supply passage for supplying a fuel from a fuel supply port formed in said injection nozzle to said balancing chamber,*

*a discharge passage for discharging the fuel from said balancing chamber*

*a second valve adapted to open and close said discharge passage, and*

*a means for controlling the lift of said second valve;*

*the opening area of said discharge passage which increases and decreases in accordance with lift of said second valve, the lift of said needle valve which increases and decreases in accordance with the opening area of said discharge passage, the opening area of said supply passage which increases and decreases in accordance with the lift of said needle valve, and the degree of opening of said injection ports which increases and decreases in accordance with the lift of said needle valve being controlled by an operation of said lift control means.*

*12. An accumulating fuel injection apparatus comprising*

*an injection nozzle provided with injection ports in a lower end portion thereof,*

*a needle valve adapted to open and close said injection ports,*

*a balancing chamber adapted to apply a fuel pressure to said needle valve,*

*a supply passage for supplying a fuel from a fuel supply port formed in said injection nozzle to said balancing chamber, and*

*a discharge passage for discharging the fuel from said balancing chamber,*

*the lift of said needle valve increasing and decreasing in accordance with the opening area of said discharge passage, the opening area of said supply passage increasing and decreasing in accordance with the lift of said needle valve, and the degree of opening of said injection ports increasing and decreasing in accordance with the lift of said needle valve,*

*the degree of opening of said injection ports being controlled in accordance with an opening area of the discharge passage using a variable lift valve.*

*13. An accumulating fuel injection apparatus comprising*

*an injection nozzle provided with injection ports in a lower end portion thereof,*

*a needle valve adapted to open and close said injection ports,*

*a balancing chamber adapted to apply a fuel pressure to said needle valve,*

*a supply passage for supplying a fuel from a fuel supply port formed in said injection nozzle to said balancing chamber, and*

*a discharge passage for discharging the fuel from said balancing chamber,*

*the lift of said needle valve increasing and decreasing in accordance with the opening area of said discharge passage, the opening area of said supply passage increasing and decreasing in accordance with the lift of said needle valve, and the degree of opening of said injection ports increasing and decreasing in accordance with the lift of said needle valve,*

*wherein said supply passage includes a groove type passage formed between said needle valve and a valve casing guiding said needle valve slidingly, and the opening area of said supply passage is an opening area of an orifice at which said groove type passage faces said balancing chamber.*

*14. An accumulating fuel injection apparatus comprising*

*an injection nozzle provided with injection ports in a lower end portion thereof,*

*a needle valve adapted to open and close said injection ports,*

*a balancing chamber adapted to apply a fuel pressure to said needle valve,*

*a supply passage for supplying a fuel from a fuel supply port formed in said injection nozzle to said balancing chamber, and*

*a discharge passage for discharging the fuel from said balancing chamber,*

*the lift of said needle valve increasing and decreasing in accordance with the opening area of said discharge passage, the opening area of said supply passage increasing and decreasing in accordance with the lift of said needle valve, and the degree of opening of said injection ports increasing and decreasing in accordance with the lift of said needle valve,*

*wherein the degree of opening of said injection nozzle is increased and decreased in accordance with the lift of said needle valve which is away from a valve seat in a position just on the upstream side of said injection ports.*

*15. An accumulating fuel injection apparatus comprising*

*an injection nozzle provided with injection ports in a lower end portion thereof,*

*a needle valve adapted to open and close said injection ports,*

*a balancing chamber adapted to apply a fuel pressure to said needle valve,*

*a supply passage for supplying a fuel from a fuel supply port formed in said injection nozzle to said balancing chamber, and*

*a discharge passage for discharging the fuel from said balancing chamber,*

*the lift of said needle valve increasing and decreasing in accordance with the opening area of said discharge passage, the opening area of said supply passage increasing and decreasing in accordance with the lift of said needle valve, and the degree of opening of said injection ports increasing and decreasing in accordance with the lift of said needle valve,*

*wherein the degree of opening of said injection nozzle is increased and decreased by changing the opening area of said injection ports by said needle valves.*

*16. An accumulating fuel injection apparatus comprising*

*an injection nozzle provided with injection ports in a lower end portion thereof,*

*a needle valve adapted to open and close said injection ports,*

*a balancing chamber adapted to apply a fuel pressure to said needle valve,*

*a supply passage for supplying a fuel from a fuel supply port formed in said injection nozzle to said balancing chamber,*

*a discharge passage for discharging the fuel from said balancing chamber, and*

*means for varying the opening of the discharge passage, the lift of said needle valve increasing and decreasing in accordance with the opening area of said discharge passage, the opening area of said supply passage increasing and decreasing in accordance with the lift of said needle valve, and the degree of opening of said injection ports increasing and decreasing in accordance with the lift of said needle valve.*

* * * * *